United States Patent
Deininger et al.

(10) Patent No.: US 12,157,271 B2
(45) Date of Patent: *Dec. 3, 2024

(54) ADDITIVE MANUFACTURING WITH DYE-INFUSED FEED MATERIAL

(71) Applicant: GM GLOBAL TECHNOLOGY OPERATIONS LLC, Detroit, MI (US)

(72) Inventors: James Joseph Deininger, Sterling Heights, MI (US); Andrew Thomas Cunningham, Cambridge, MA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/654,112

(22) Filed: Mar. 9, 2022

(65) Prior Publication Data

US 2023/0286213 A1  Sep. 14, 2023

(51) Int. Cl.
 *B29C 64/314* (2017.01)
 *B29C 64/118* (2017.01)
 (Continued)

(52) U.S. Cl.
 CPC .......... *B29C 64/314* (2017.08); *B29C 64/118* (2017.08); *B29C 64/141* (2017.08);
 (Continued)

(58) Field of Classification Search
 CPC ... B29C 64/314; B29C 64/118; B29C 64/141; B29C 64/165; B29C 64/153;
 (Continued)

(56) References Cited

U.S. PATENT DOCUMENTS

2001/0020311 A1* 9/2001 Veugelers ................ D06P 1/94
 8/456
2017/0036377 A1* 2/2017 Baghdadi ............... A43B 13/16
2018/0345576 A1* 12/2018 Constantinou ........ B29C 64/264

FOREIGN PATENT DOCUMENTS

CN  101812810 A  8/2010
CN  107524028 A  12/2017
(Continued)

*Primary Examiner* — Michael M. Robinson
(74) *Attorney, Agent, or Firm* — Lorenz & Kopf LLP

(57) ABSTRACT

Methods for manufacturing three-dimensional objects using an additive manufacturing technique, methods for forming dye-infused feed material for an additive manufacturing technique, and vehicles including additive manufactured components are provided. An exemplary method for manufacturing a three-dimensional object using an additive manufacturing technique includes solubilizing a dye into a medium in the form of a supercritical fluid and contacting a feed material with the medium to infuse the dye into the feed material to form dye-infused feed material. The method further includes locally melting the dye-infused feed material in selected regions of a layer corresponding to a cross-section of a three-dimensional object being formed and solidifying the dye-infused feed material into a solid layer of dye-infused material. Further, the method includes repeating the local melting and solidifying steps to form the three-dimensional object made up of a plurality of solid layers of dye-infused material.

12 Claims, 4 Drawing Sheets

(51) Int. Cl.
  *B29C 64/141* (2017.01)
  *B29K 77/00* (2006.01)
  *B29K 105/00* (2006.01)
  *B29L 31/30* (2006.01)
  *B33Y 10/00* (2015.01)
  *B33Y 40/10* (2020.01)
  *B33Y 70/00* (2020.01)
  *B33Y 80/00* (2015.01)

(52) U.S. Cl.
  CPC .............. *B33Y 10/00* (2014.12); *B33Y 40/10* (2020.01); *B33Y 70/00* (2014.12); *B29K 2077/00* (2013.01); *B29K 2105/0032* (2013.01); *B29L 2031/30* (2013.01); *B33Y 80/00* (2014.12)

(58) Field of Classification Search
  CPC ......... B33Y 10/00; B33Y 40/10; B33Y 70/00; B33Y 80/00; B29K 2077/00; B29K 2105/0032; B29L 2031/30
  See application file for complete search history.

(56) References Cited

FOREIGN PATENT DOCUMENTS

| | | |
|---|---|---|
| DE | 69612762 T2 | 5/2002 |
| DE | 102019111896 A1 | 11/2020 |

* cited by examiner

ADDITIVE MANUFACTURING WITH DYE-INFUSED FEED MATERIAL

INTRODUCTION

The technical field of this disclosure relates generally to additive manufacturing and, more particularly, to additive manufacturing of dye-infused three-dimensional objects from dye-infused feed material.

Additive manufacturing methods have emerged as cost effective alternatives to casting and machining methods. Additive manufacturing is also known as "layered manufacturing", "laser sintering", "powder sintering", "fused filament fabrication", and "three-dimensional printing". For purposes of this disclosure, these terms are all considered synonyms. Basically, additive manufacturing techniques are based on the concept of building material in a cross-sectional layer-by-layer manner to form a three-dimensional object. Common to additive manufacturing techniques is the use of three-dimensional modeling software (computer aided design or CAD), machine equipment, and layered materials. Once the CAD sketch is generated, the manufacturing device reads in data from the CAD file and manufactures the three-dimensional part using successive layers from the selected feed material.

Unlike casting processes, additive manufacturing is not limited by the necessity of providing draft angles, avoiding overhang, etc. Additive manufacturing also simplifies and reduces costs associated with metal alloy component manufacturing compared to typical casting and machining methods.

In many processing schemes, three-dimensional components formed by additive manufacturing must undergo additional processing for aesthetic purposes. For example, an additive manufactured three-dimensional component may be painted or coated. Alternatively, processes may involve mechanically mixing dye with additive manufacturing feed material before forming the three-dimensional components.

Thus, while current additive manufacturing machines and methods achieve their intended purpose, there remains a need for an improved method for forming additive manufactured parts that eliminates or reduces the need for further processing. Further, there remains a need for an improved method for forming feed material to support such a method. Furthermore, other desirable features and characteristics will become apparent from the subsequent detailed description and the appended claims, taken in conjunction with the accompanying drawings and the foregoing technical field and background.

SUMMARY

Methods for manufacturing three-dimensional objects using an additive manufacturing technique, methods for forming dye-infused feed material for an additive manufacturing technique, and vehicles including additive manufactured components are provided.

In an embodiment, a method for manufacturing a three-dimensional object using an additive manufacturing technique is provided. The exemplary method includes (a) solubilizing a dye into a medium in the form of a supercritical fluid; (b) contacting a feed material with the medium in the form of a supercritical fluid to infuse the dye into the feed material to form dye-infused feed material; (c) locally melting the dye-infused feed material in selected regions of a layer corresponding to a cross-section of a three-dimensional object being formed; (d) solidifying the dye-infused feed material into a solid layer of dye-infused material; and (e) repeating steps (c) and (d) to form the three-dimensional object made up of a plurality of solid layers of dye-infused material.

In certain embodiments of the method, the feed material is powder. In certain embodiments of the method, the feed material is a filament. When a filament, the feed material may be wound or spooled on a spool during step (b).

In certain embodiments of the method, the feed material is polyamide.

In certain embodiments of the method, (a) solubilizing a dye into a medium in a supercritical fluid state and (b) contacting a feed material with the medium in a supercritical fluid state to infuse the dye into the feed material to form dye-infused feed material includes: locating the dye in a chamber; locating the feed material in the chamber; feeding the medium into the chamber; modifying conditions in the chamber such that the medium changes to a supercritical fluid state; solubilizing the dye in the medium in a supercritical fluid state; and diffusing the dye from the medium in a supercritical fluid state into the feed material. In such embodiments, feeding the medium into the chamber may include pumping the medium in a liquid state into the chamber. Further, in such embodiments, modifying conditions in the chamber such that the medium becomes a supercritical fluid may include pressurizing or pressurizing and heating the chamber to supercritical conditions. Likewise, in such embodiments, the method may include depressurizing the chamber and removing the dye-infused feed material from the chamber.

In certain embodiments of the method, the medium in the form of a supercritical fluid is supercritical carbon dioxide. In certain embodiments, the medium may further include a co-solvent or co-solvents to facilitate or quicken solubilization of the dye into the medium.

In certain embodiments of the method, the three-dimensional object has a dye concentration of less than about 5 weight %, based on a total weight of the three-dimensional object.

In certain embodiments of the method, steps (a) and (b) are performed in a first manufacturing station in a manufacturing facility, steps (c) and (d) are performed in a second manufacturing station in the manufacturing facility, and the method further includes transporting the dye-infused feed material from the first manufacturing station to the second manufacturing station.

In another embodiment, a method for forming a dye-infused feed material for an additive manufacturing technique is provided. The method includes solubilizing a dye into a medium in a supercritical fluid state; and contacting an additive manufacturing feed material with the medium in the supercritical fluid state to infuse the dye into the additive manufacturing feed material to form dye-infused feed material.

In certain embodiments, the method further includes: locating the dye in a chamber; locating the additive manufacturing feed material in the chamber; feeding the medium into the chamber; modifying conditions in the chamber such that the medium changes to a supercritical fluid state; solubilizing the dye in the medium in a supercritical fluid state; and diffusing the dye from the medium in a supercritical fluid state into the additive manufacturing feed material.

In certain embodiments of the method, the additive manufacturing feed material is powder or a filament. When in the form of a filament, the feed material may be wound or spooled on a spool during step (b).

In certain embodiments of the method, the additive manufacturing feed material is polyamide.

In certain embodiments of the method, the medium in the form of a supercritical fluid is supercritical carbon dioxide. In certain embodiments, the medium may further include a co-solvent or co-solvents to facilitate or quicken solubilization of the dye into the medium.

In certain embodiments of the method, the dye-infused feed material has a dye concentration of less than about 5 weight %, based on a total weight of the dye-infused feed material.

In another embodiment, a vehicle is provided. The exemplary vehicle includes a three-dimensional vehicle component manufactured from a dye-infused feed material using an additive manufacturing technique.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to additive manufacturing, such as to additive manufacturing of dyed three-dimensional objects. Embodiments herein provide for forming dye-infused additive manufacturing feed material, such as in the form of powder or particulate or in the form of filament. Embodiments herein also provide for manufacturing a dye-infused three-dimensional object from the dye-infused additive manufacturing feed material.

More specifically, embodiments herein provide for infusing dye into additive manufacturing through the use of supercritical fluid. As used herein, "supercritical fluid" means a material that is neither liquid nor gas and that is at, or at a temperature higher than, the "critical temperature" of the material and at, or at a pressure higher than, the "critical pressure" of the material. In such conditions, the properties of the supercritical fluid are partially analogous to those of a liquid (for example, the density) and partially similar to those of a gas (for example, the viscosity).

Figure 1:
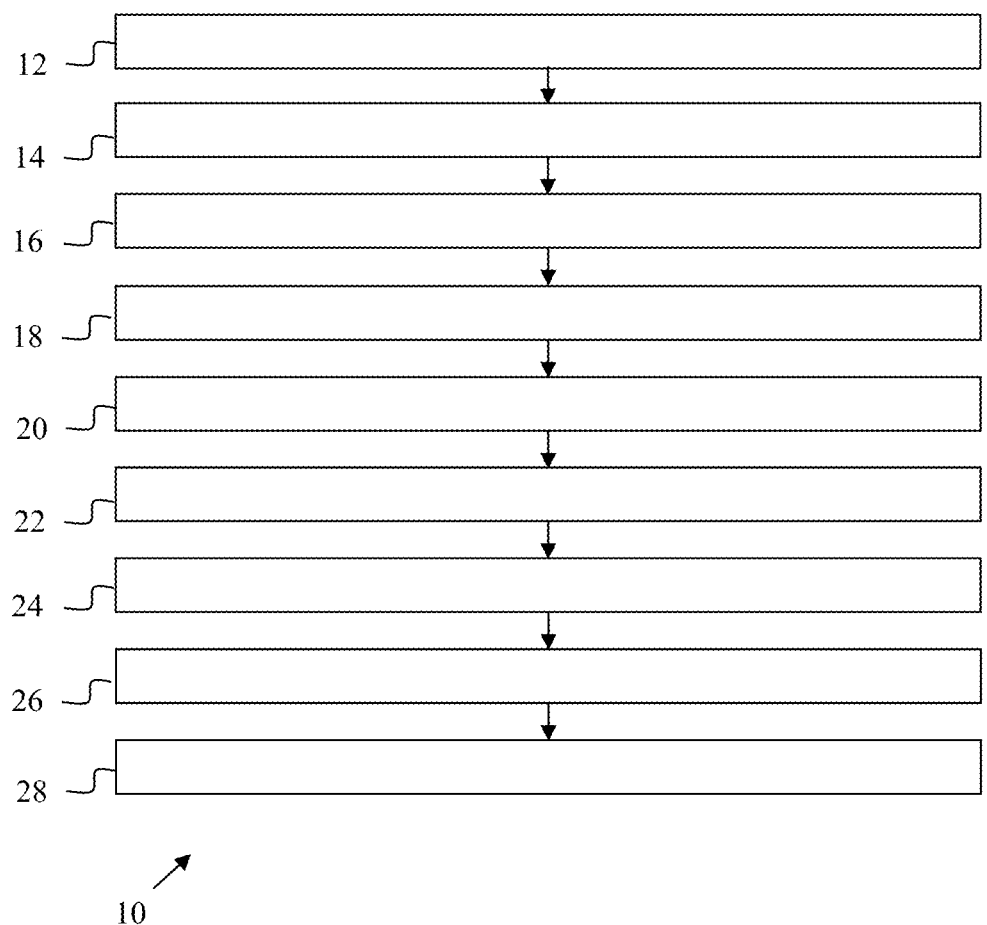
FIG. 1 is a flow chart illustration of a method for forming a dye-infused feed material, in accordance with various embodiments.
Figure 2:
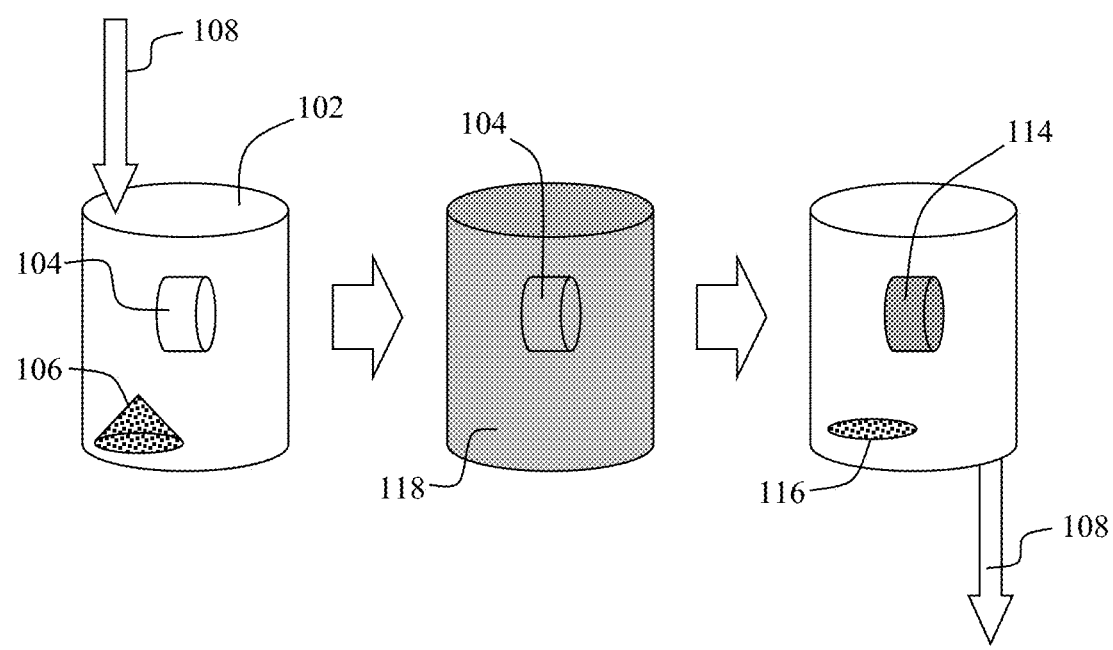
FIG. 2 is a schematic of a method for forming a dye-infused feed material, in accordance with various embodiments.

Referring now to FIGS. 1 and 2, a method 10 is described for forming a dye-infused additive manufacturing feed material 114. The method 10 includes, at operation 12, locating an additive manufacturing feed material 104 in a chamber 102. An exemplary additive manufacturing feed material 104 is in the form of powder or other particulate, or in the form of a filament (as shown in FIG. 2) or filaments. An exemplary additive manufacturing feed material 104 has a particulate average diameter or filament diameter of less than 3 millimeters (mm), such as less than 2.5 mm, less than 2 mm, less than 1.75 mm, less than 1.5 mm, less than 1.25 mm, less than 1 mm, less than 0.75 mm, or less than 0.5 mm. An exemplary additive manufacturing feed material 104 has a particulate average diameter or filament diameter of at least 0.5 mm, such as at least 0.75 mm, at least 1 mm, at least 1.25 mm, at least 1.5 mm, at least 1.75 mm, at least 2 mm, at least 2.25 mm, at least 2.5 mm, or at least 2.75 mm.

For additive manufacturing feed material 104 in the form of a filament, the additive manufacturing feed material may be wound (as shown in FIG. 2), or wound on a spool. The spool may also be located in the chamber 102. In exemplary embodiments, the spool is made from a material that is impervious to infusion. For example, the spool may be a metal.

An exemplary feed material is a plastic, such as polyamide. Other possible fee materials include ABS (acrylonitrile butadiene styrene), PLA (polylactic acid), PEI (polyethylenimine), PPSU (polyphenylsulfone), PEEK (polyether ether ketone), etc., as well as ceramics.

Further, the method 10 includes, at operation 14, locating a dye 106 in the chamber. Any suitable dye that may be solubilized by, or dissolved in, the supercritical medium described below may be used. Exemplary dyes may include organic dyes. In certain embodiments, the dye 106 may be selected from organic dyes such as coumarin 460 (blue), coumarin 6 (green), Nile red or the like; lanthanide complexes; hydrocarbon and substituted hydrocarbon dyes; polycyclic aromatic hydrocarbons; scintillation dyes (preferably oxazoles and oxadiazoles); aryl or heteroaryl substituted poly(2-8 olefins); carbocyanine dyes; dyes and pigments based on phthalocyanine; oxazine dyes; carbostyril dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo (a) phenoxazonium perchlorate; 7-amino-4-methylcarbostyryl; 7-amino-4-methylcoumarin; 3-(2-benzimidazolyl)-7-N,N-diethylaminocoumarin; 3-(2-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4-bis-(2-butyloctyloxy)-p-quaterphenyl; p-bis(o-methylstyryl)-benzene; 5,9-diaminobenzo (a) phenoxazonium perchlorate; 4-dicyanomethylene-2-methyl-6-(p-dimethylaminostyryl)-4H-pyran; 1,1-diethyl-2,2-carbocyanine iodide; 3,3-diethyl-4,4,5,5-dibenzothiatricarbocyanine iodide; 7-diethylamino-4-methylcoumarin; 7-diethylamino-4-trifluoromethylcoumarin; 2,2-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; the red of the Nile; rhodamine 700; oxazine 750; rhodamine 800; IR 125; IR 144; IR 140; IR 132; IR 26; IR 5; diphenylhexatriene; diphenylbutadiene; tetraphenylbutadiene; mothballs; anthracene; 9,10-diphenylanthracene; pyrene; chrysene; rubrene; coronene; phenanthrene or the like, or combinations including at least one of the foregoing dyes.

In exemplary embodiments, the dye 106 is a solid when located in the chamber.

As shown in FIG. 1, the method 10 further includes, at operation 16, feeding a medium 108 into the chamber 102. In exemplary embodiments, the medium 108 is a liquid when fed into the chamber 102. An exemplary medium 108 is carbon dioxide ($CO_2$) though other suitable compounds may be used.

In exemplary embodiments, the chamber 102 is filled with the medium 108 such that substantially all of any ambient fluid, such as air, is removed from chamber 102.

The method 10 includes, at operation 18, sealing the chamber 102 and modifying the conditions in the chamber 102. Specifically, the chamber 102 may be pressurized and/or pressurized and heated.

For example, in certain embodiments, the chamber 102 is pressurized to a pressure of at least 72.8 atm (7.3773 MPa, 1,070 psi, 73.8 bar), such as at least 75 atm, at least 100 atm, at least 125 atm, at least 150 atm, or at least 200 atm. In certain embodiments, the chamber 102 is pressurized to a pressure of no more than 700 atm, such as no more than 500 atm, no more than 400 atm, no more than 300 atm, no more than 275 atm, no more than 250 atm, no more than 225 atm, or no more than 200 atm. In certain embodiments, the chamber 102 is pressurized to a pressure of from 75 to 700 atm, such as from 125 to 275 atm, for example about 200 atm.

Further, in certain examples, the chamber 102 may be heated to a temperature of at least 31° C., such as at least 40° C., at least 50° C., at least 75° C., at least 90° C., at least 100° C., or at least 120° C., and a temperature of no more than 200° C., such as no more than 150° C., no more than 120° C., or no more than 100° C. In exemplary embodiments, the chamber 102 is heated to a temperature of from 40 to 200° C., such as from 75 to 150° C., for example from 100 to 120° C.

As a result of the modified conditions in the chamber 102, the medium 108 changes from the liquid state to the supercritical state, i.e., the medium becomes a supercritical fluid 118.

The method 10 further includes, at operation 20, solubilizing the dye 106 in the medium in the form of the supercritical fluid 118. The dye 106 may solubilize in the supercritical fluid 118 within moments of changing the state of the medium to the supercritical state. When solubilized, the dye 106 is dissolved into the supercritical fluid 118 and equally dispersed throughout the volume of the chamber 102.

The method 10 includes, at operation 22, diffusing the dye 102 into the feed material 104 to form a dye-infused additive manufacturing feed material 114. Typically, the dye 106 diffuses into the feed material 104 within several hours. In an exemplary embodiment, the dye 102 diffuses into the feed material 104 in a duration of 3 hours or less, such as in 2 hours or less, for example in 90 minutes or less, 60 minutes or less, 40 minutes or less, or 30 minutes or less. In exemplary embodiments, the dye 106 diffuses into the feed material 104 in a duration of at least 30 minutes, such as at least 40 minutes, at least 60 minutes, at least 90 minutes, or at least two hours. It is contemplated that increasing the pressure and/or temperature of the chamber 102 may decrease the duration of time needed to diffuses into the feed material 104.

In certain embodiments, the dye 106 diffuses into the feed material 104 completely, such that a cross-section of the dye-diffused additive manufacturing feed material 114 would exhibit a uniform amount of dye 106 infused at all distances from the feed material surface. In other embodiments, operation 22 may be performed at conditions and for a duration such that the dye 106 diffuses only partway into each feed material element (particle or filament), i.e., to a certain depth from a surface of the feed material 104.

In exemplary embodiments, after diffusing the dye 106 into the feed material 104, the dye-infused additive manufacturing feed material 114 has a dye concentration that is or is less than 5 weight percent (wt. %), 4 weight percent, 3 weight percent, 2 weight percent, or 1 weight percent, based on a total weight of the feed material.

In exemplary embodiments, after diffusing the dye 106 into the feed material 104, the dye-infused additive manufacturing feed material 114 has a dye concentration that is or is greater than 0.5 weight percent, 1 weight percent, 2 weight percent, 3 weight percent, 4 weight percent, or 5 weight percent, based on a total weight of the feed material.

It may be seen from FIGS. 1 and 2, that locating the feed material 104 and the dye 106 in the chamber 102, feeding the medium 108 into the chamber 102, modifying the conditions in the chamber 102 to form the medium 108 as a supercritical fluid, and solublizing the dye 106 into the supercritical fluid 118 collectively cause contact of the feed material with the medium in the form of a supercritical fluid to infuse the dye into the feed material 104 to form dye-infused additive manufacturing feed material 114.

At operation 24, the method returns the chamber 102 to non-critical conditions, such as by de-pressurizing or de-pressurizing and cooling the chamber 102.

Thereafter, at operation 26, the method removes the medium 108 from the chamber 102. For example, the medium 108 in the liquid state may be pumped or drained from the chamber 102.

The method 10 includes, at operation 28, removing the dye-infused additive manufacturing feed material 114 and any remaining dye 116 from the chamber 102. Thereafter, the dye-infused additive manufacturing feed material may be stored or may be transported for use in additive manufacturing.

Thus method 10 forms a dye-infused additive manufacturing feed material 114, such that an additive manufacturing technique utilizing such feed material manufactures a dye-infused three-dimensional object of a pre-selected color. Such a manufacturing process may eliminate a need for an application of paint or another color-imparting coating.

Figure 3:
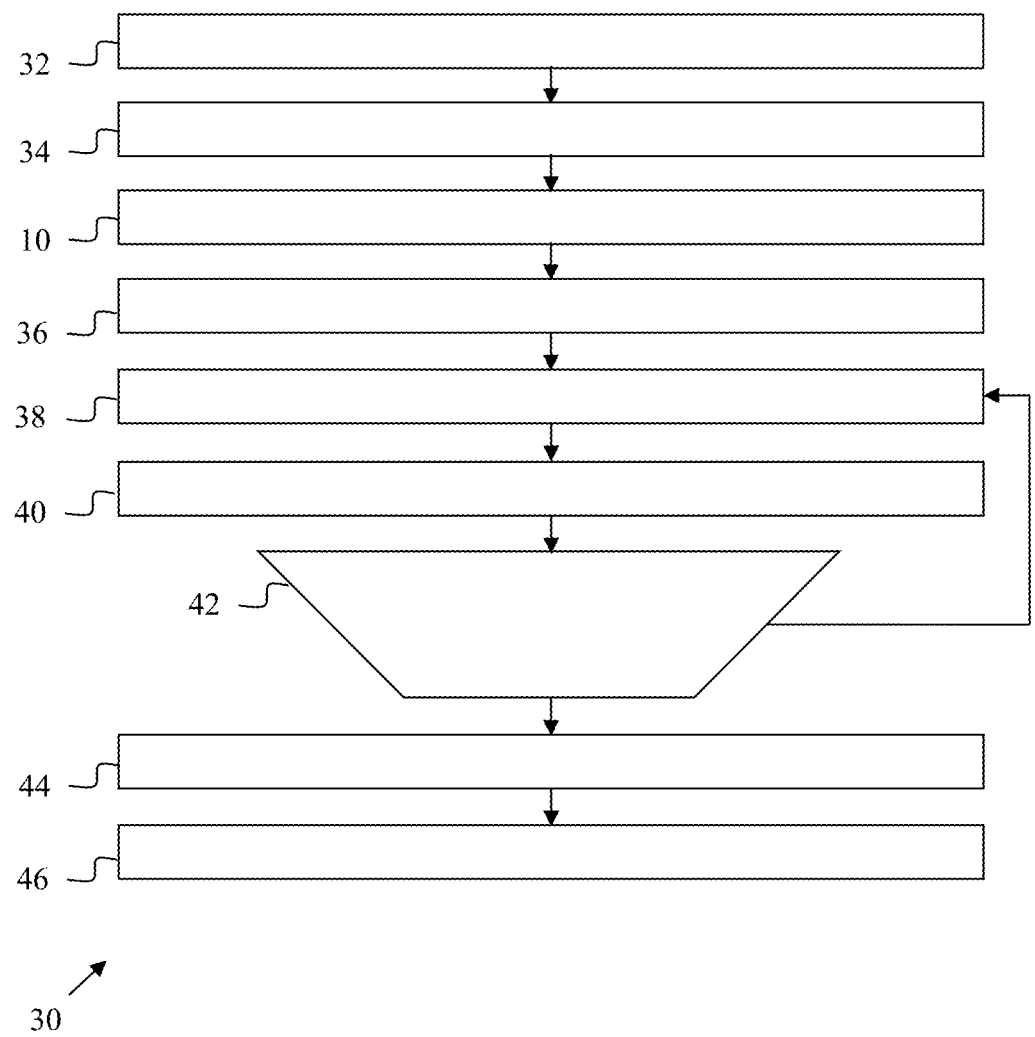
FIG. 3 is a flow chart illustration of a method for manufacturing a three-dimensional object using an additive manufacturing technique, in accordance with various embodiments.
Figure 4:
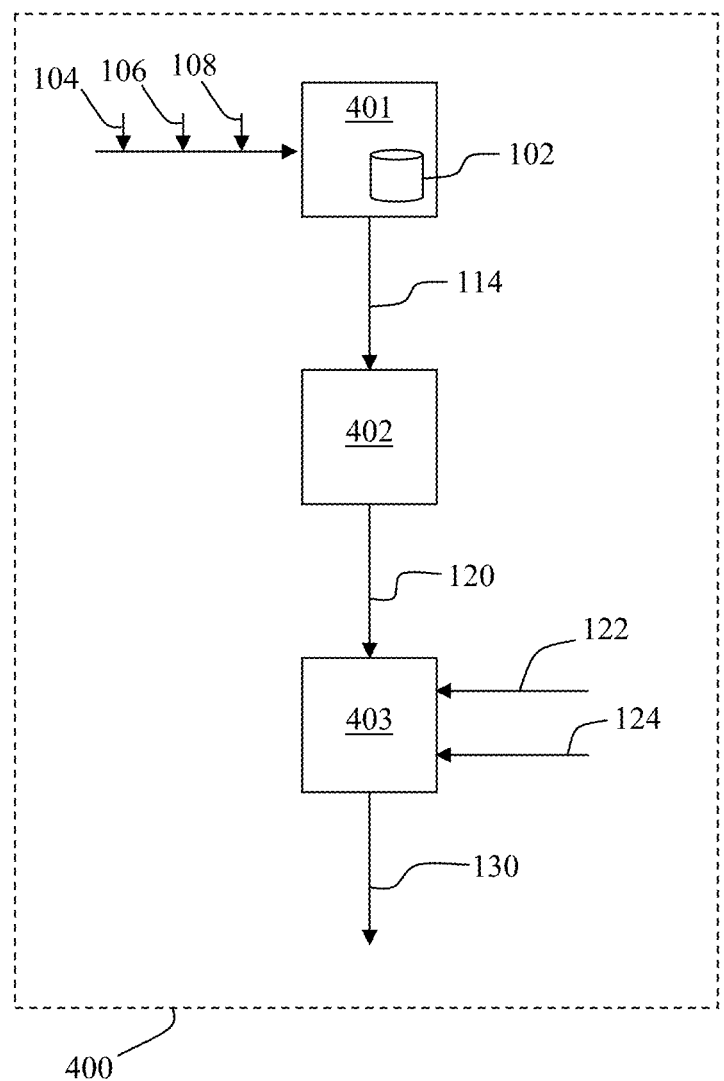
FIG. 4 is a schematic of a method for manufacturing a three-dimensional object using an additive manufacturing technique, in accordance with various embodiments.

Referring now to FIGS. 3 and 4, a method 30 is described for manufacturing a dye-infused three-dimensional object 120 using an additive manufacturing technique. As shown, method 30 includes method 10, from FIG. 1, for forming a dye-infused feed material 114. For example, method 30 includes solubilizing a dye 106 into a medium 108 in the form of a supercritical fluid 118 and contacting a feed material 104 with the medium in the form of a supercritical fluid 118 to infuse the dye 106 into the feed material 104 to form dye-infused feed material 114.

In exemplary embodiments, the inputs used in method 10, e.g., the feed material 104, the dye 106, and the medium 108, are stored in the manufacturing plant 400 at operation 32 of method 30. More specifically, a plurality of feed materials with selected compositions, shapes, sizes, etc. may be stored in the manufacturing plant 400 such that a desired feed material 104 may be selected for use in method 10 at a particular time. Likewise, a plurality of dyes with selected compositions and colors may be stored in the manufacturing plant 400 such that a desired dye may be selected for use in method 10 at a particular time. Also, a plurality of mediums 108, a plurality of mediums or media of selected compositions may be stored in the manufacturing plant 400 such that a desired medium may be selected for use in method 10 at a particular time.

As shown, chamber 102 is located within first work station 401. Chamber 102 may be permanently located in first work stations 401, or may be transported into and out of first work stations 401.

At operation 34, method 30 selects inputs and transports the selected inputs to first work stations 401. Selection and/or selection and transport may be automated and performed by a processor and robot. In first work stations 401, method 10 is performed to form the dye-infused feed material 114 as described above.

After forming the dye-infused feed material 114, method 30 may include, at operation 36, transporting the dye-infused feed material 114 from the first work station 401 to a second work station 402 within the same manufacturing plant 400. In exemplary embodiments, a cart or pod may be used robotically or manually to carry the dye-infused feed material 114 from the first work station 401 to the second work station 402.

At operation 38, the method 30 melts the dye-infused feed material 114, such as in an additive manufacturing process. Further, at operation 40, the method 30 solidifies the melted dye-infused feed material into a solid layer, such as by cooling the melted dye-infused feed material into a solid layer.

Method 30 contemplates different scenarios for the performance of operations 38 and 40, depending on the additive manufacturing technique used. Generally, operation 38 includes locally melting the dye-infused feed material 114 in selected regions of a layer corresponding to a cross-section of a three-dimensional object being formed and operation 40 includes solidifying the dye-infused feed material into a solid layer of dye-infused material. In certain embodiments, a portion of the dye-infused feed material 114 may be arranged in a layer of a three-dimensional object to be formed, and the layer may be heated to melt and form a melted pool. Then the melted pool may be solidified, such as by cooling or by ceasing the melting process to form a layer of the object to be formed. In other embodiments, portions of the dye-infused feed material may be continuously melted and cooled to form a layer of the object to be formed. Thus, operations 38 and 40 may be performed in series or continuously as indicated by the additive manufacturing technique used.

At query 42, the method 30 queries whether the dye-infused three-dimensional object 120 is complete. If not, the method 30 continues with operation 38. Thus, operations 38 and 40 are repeated to form the dye-infused three-dimensional object 120 made up of a plurality of solid layers of dye-infused material. When query 42 determines that the dye-infused three-dimensional object 120 is complete, then the method 30 continues with, at operation 44, transporting the dye-infused three-dimensional object 120 out of the second station 402. For example, the dye-infused three-dimensional object 120 may transported from the second work station 402 to a third work station 403 within the same manufacturing plant 400. In exemplary embodiments, a cart or pod may be used robotically or manually to carry the dye-infused three-dimensional object 120 from the second work station 402 to the third work station 403.

In certain embodiments, the dye-infused three-dimensional object 120 is an automotive vehicle part. Method 30 may include, at operation 46, assembling the dye-infused three-dimensional object 120 into a vehicle. For example, the dye-infused three-dimensional object 120 may be assembled with other dye-infused three-dimensional objects 122 or with other parts 124 to form an assembly 130 for the vehicle.

Method 30 provides for manufacturing a three-dimensional object that is dye-infused such that the object has a consistent profile of dye dispersed throughout the three-dimensional object.

In exemplary embodiments, the dye-infused three-dimensional object 122 has a dye concentration that is or is less than 5 weight percent (wt. %), 4 weight percent, 3 weight percent, 2 weight percent, or 1 weight percent, based on a total weight of the feed material.

In exemplary embodiments, the dye-infused three-dimensional object 122 has a dye concentration that is or is greater than 0.5 weight percent, 1 weight percent, 2 weight percent, 3 weight percent, 4 weight percent, or 5 weight percent, based on a total weight of the feed material.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a three-dimensional object using an additive manufacturing technique, the method comprising:
   (i) storing a plurality of feed materials with different, shapes, and/or sizes, a plurality of dyes having different compositions and colors, and a plurality of mediums of different compositions in a manufacturing facility;

ii) selecting a feed material from the plurality of feed materials;
iii) selecting a dye from the plurality of dyes;
iv) selecting a medium from the plurality of mediums;
(a) solubilizing the selected dye into the selected medium in the form of a supercritical fluid;
(b) contacting the selected feed material with the selected medium in the form of a supercritical fluid to infuse the selected dye into the selected feed material to form dye-infused feed material;
(c) melting the dye-infused feed material in selected regions of a layer corresponding to a cross-section of a three-dimensional object being formed to form a melted pool;
(d) solidifying the melted pool into a solid layer of dye-infused material;
(e) repeating steps (c) and (d) to form the three-dimensional object made up of a plurality of solid layers of dye-infused material; and
(f) assembling the dye-infused three-dimensional object into a vehicle, wherein the three-dimensional object has a consistent profile of dye dispersed throughout the three-dimensional object.

2. The method of claim 1, wherein the feed material is powder.

3. The method of claim 1, wherein the feed material is a filament.

4. The method of claim 1, wherein the feed material is a filament and wherein the filament is spooled on a spool during step (b).

5. The method of claim 1, wherein the feed material is polyamide.

6. The method of claim 1, wherein (a) solubilizing a dye into a medium in a supercritical fluid state and (b) contacting a feed material with the medium in a supercritical fluid state to infuse the dye into the feed material to form dye-infused feed material comprises:
locating the dye in a chamber;
locating the feed material in the chamber;
feeding the medium into the chamber;
modifying conditions in the chamber such that the medium changes to a supercritical fluid state;
solubilizing the dye in the medium in a supercritical fluid state; and
diffusing the dye from the medium in a supercritical fluid state into the feed material.

7. The method of claim 6, wherein feeding the medium into the chamber comprises pumping the medium in a liquid state into the chamber.

8. The method of claim 6, wherein modifying conditions in the chamber such that the medium becomes a supercritical fluid comprises pressurizing or pressurizing and heating the chamber to supercritical conditions.

9. The method of claim 8, further comprising depressurizing the chamber and removing the dye-infused feed material from the chamber.

10. The method of claim 1, wherein the medium in the form of a supercritical fluid is supercritical carbon dioxide.

11. The method of claim 1, wherein the three-dimensional object has a dye concentration of less than about 5 weight %, based on a total weight of the three-dimensional object.

12. The method of claim 1, wherein steps (a) and (b) are performed in a first manufacturing station in the manufacturing facility, and wherein steps (c) and (d) are performed in a second manufacturing station in the manufacturing facility, and wherein the method further comprises transporting the dye-infused feed material from the first manufacturing station to the second manufacturing station.

* * * * *